(12) United States Patent
Chang et al.

(10) Patent No.: US 9,213,546 B2
(45) Date of Patent: Dec. 15, 2015

(54) IMPLEMENTATION OF INSTRUCTION FOR DIRECT MEMORY COPY

(71) Applicant: International Business Machines Corporation, Armonk, NY (US)

(72) Inventors: Xiao T. Chang, Beijing (CN); Fei Chen, Beijing (CN); Kun Wang, Beijing (CN); Wen X. Wang, Beijing (CN); Yu Zhang, Beijing (CN); Wei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/850,481

(22) Filed: Mar. 26, 2013

(65) Prior Publication Data

US 2013/0326165 A1    Dec. 5, 2013

(30) Foreign Application Priority Data

May 31, 2012    (CN) .......................... 2012 1 0177865

(51) Int. Cl.
*G06F 13/00*    (2006.01)
*G06F 9/30*    (2006.01)

(52) U.S. Cl.
CPC .......... *G06F 9/3004* (2013.01); *G06F 9/30032* (2013.01)

(58) Field of Classification Search
CPC ........................... G06F 9/30032; G06F 9/3004
USPC ........................................................ 711/155
See application file for complete search history.

(56) References Cited

U.S. PATENT DOCUMENTS 5,826,106 A    10/1998    Pang
6,003,112 A    12/1999    Tetrick
(Continued)

FOREIGN PATENT DOCUMENTS

CN    1894674 A    1/2007
CN    101299349 A    11/2008
(Continued)

OTHER PUBLICATIONS

K. Vaidyanathan et al., "Efficient Asynchronous Memory Copy Operations on Multi-Core Systems and I/OAT", Cluster Computing, 2007 IEEE International Conference, Sep. 17-20, 2007, pp. 159-168.

(Continued)

*Primary Examiner* — Yong Choe
(74) *Attorney, Agent, or Firm* — L. Jeffrey Kelly; Vazken A. Alexanian (57) ABSTRACT

Embodiments of the present invention relate to a method and system for performing a memory copy. In one embodiment of the present invention, there is provided a method for performing memory copy, including: decoding a memory copy instruction into at least one microcode in response to receipt of the memory copy instruction, transforming the at least one microcode into a ReadWrite Command for each of the at least one microcode, and notifying a memory controller to execute the ReadWrite Command, wherein the ReadWrite Command is executed by the memory controller and comprises at least a physical source address, a physical destination address and a ReadWrite length that are associated with the ReadWrite Command. In another embodiment of the present invention, there is provided a system for performing a memory copy.

14 Claims, 8 Drawing Sheets

(56) References Cited

U.S. PATENT DOCUMENTS

| | | |
|---|---|---|
| 6,366,970 B1 | 4/2002 | Wolff et al. |
| 8,140,801 B2 | 3/2012 | Arimilli et al. |
| 2005/0108499 A1 | 5/2005 | Huang et al. |
| 2007/0101101 A1 | 5/2007 | Odahara et al. |
| 2010/0199054 A1 | 8/2010 | Kishore et al. |

FOREIGN PATENT DOCUMENTS

| | | |
|---|---|---|
| CN | 102084332 A | 6/2011 |
| CN | 103455280 A | 12/2013 |

OTHER PUBLICATIONS

Mike Wall, "Using Block Prefetch for Optimized Memory Performance", Advanced Micro Devices, 2001, pp. 1-15.

IMPLEMENTATION OF INSTRUCTION FOR DIRECT MEMORY COPY

The present application claims the benefit of priority of Chinese Patent Application Serial Number 201210177865.6, entitled "IMPLEMENTATION OF INSTRUCTION FOR DIRECT MEMORY COPY", filed May 31, 2012 with the State Intellectual Property Office (SIPO) of the People's Republic of China, the contents of which are incorporated by reference herein in its entirety.

TECHNICAL FIELD

Embodiments of the present invention relate to memory copy, and more specifically, to a method and system for performing copy by a central memory and a memory controller.

BACKGROUND

With the development of network technology and multimedia technology, various applications have made a higher and higher demand for the execution efficiency of memory copy. For example, when a multimedia play application accesses, for example, video resources via a network, usually it is necessary to pre-download a section of a to-be-played application to a memory for buffering, so as to avoid a delay during playing. At this point, memory copy is used to copy the buffered video from one location of the memory to another location so as to play the buffered video. In addition, memory copy is also required to be performed in other applications that need to frequently move data in a memory.

In the case of the foregoing video play application, memory copy is required to be performed in "real time" as far as possible, otherwise adverse consequences such as a pause might occur during the video play. However, memory copy approaches in the prior art highly rely on the data transmission efficiency on a bus and the control at a central processor; when the bus is occupied by other applications or the load of the central processor itself is relatively heavy, the data transmission efficiency on the bus and the workload at the central processor become a bottleneck affecting the execution efficiency of memory copy.

SUMMARY OF THE INVENTION

Therefore, it has become an urgent problem regarding how to achieve high-efficiency memory copy without changing the existing user programming interface for memory copy processing. To this end, embodiments of the present invention provide a method for performing memory copy and a corresponding system.

In one embodiment of the present invention, there is provided a method for performing a memory copy, including: decoding a memory copy instruction into at least one microcode in response to receipt of the memory copy instruction; transforming the at least one microcode into a ReadWrite Command for each of the at least one microcode; and notifying a memory controller to execute the ReadWrite Command; wherein the ReadWrite Command is executed by the memory controller and comprises at least a physical source address, a physical destination address and a ReadWrite length that are associated with the ReadWrite Command.

In another embodiment of the present invention, there is provided a system for performing a memory copy, including: a decoding module configured to decode a memory copy instruction into at least one microcode in response to receipt of the memory copy instruction; a transforming module configured to transform the at least one microcode into a ReadWrite Command for each of the at least one microcode; and a notifying module configured to notify a memory controller to execute the ReadWrite Command; wherein the memory controller is configured to execute the ReadWrite Command; wherein the ReadWrite Command comprises at least a physical source address, a physical destination address and a ReadWrite length that are associated with the ReadWrite Command.

With embodiments of the present invention, high-efficiency memory copy may be achieved without changing any existing user interface for memory copy processing. In embodiments of the present invention, the memory copy instruction is interpreted by the central processor as ReadWrite Commands executed by the memory controller, wherein the ReadWrite Commands are independent of workloads of the central processor and the bus. Therefore, it is possible to significantly remove the bottleneck in the prior art affecting the execution efficiency of memory copy, thereby achieving high-efficiency memory copy.

BRIEF DESCRIPTION OF THE DRAWINGS

The above and other objects, features and advantages of the present disclosure will become more apparent through the more detailed description of exemplary embodiments of the present disclosure in conjunction with the accompanying drawings in which like reference numbers generally refer to like components in the embodiments of the present disclosure.

DETAILED DESCRIPTION OF EMBODIMENTS

Some preferable embodiments of the present disclosure will be described in more detail with reference to the accompanying drawings. The preferable embodiments of the present disclosure have been illustrated in the accompanying drawings; however it should be appreciated that the present disclosure can be implemented in various manners, and is not limited to the embodiments disclosed herein. On the contrary, those embodiments are provided for the thorough and complete understanding of the present disclosure, and completely conveying the scope of the present disclosure to those skilled in the art.

Figure 1:
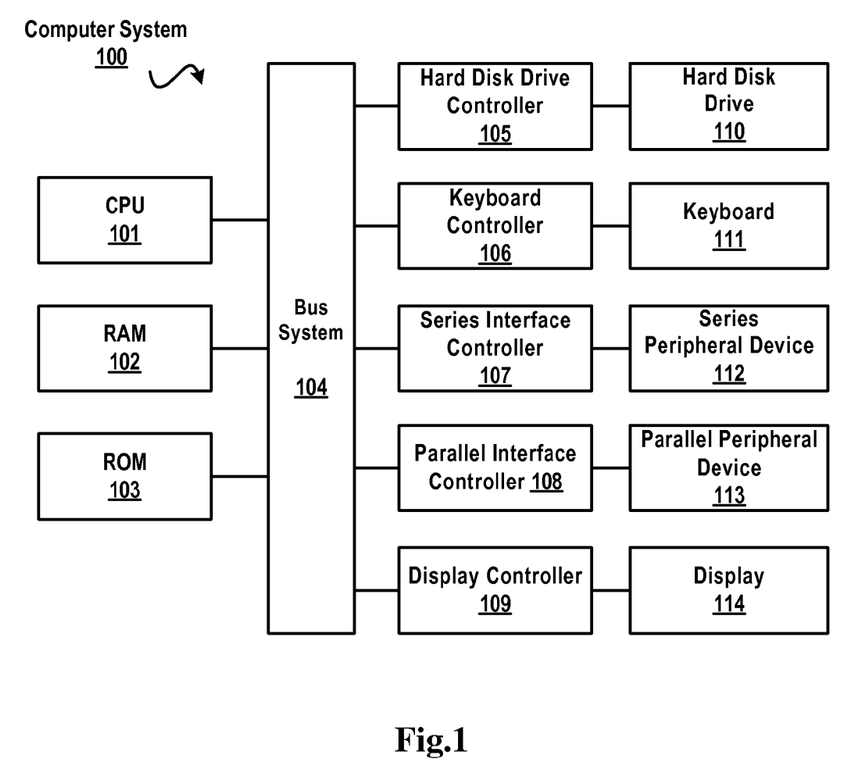
FIG. 1 schematically shows a block diagram of an exemplary computer system which is applicable to implement the embodiments of the present invention.

FIG. 1 shows a block diagram of an exemplary computer system 100 which can be used to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Device 112, Parallel Peripheral Device 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Device 112 is coupled to Serial Interface Controller 107. Parallel Peripheral Device 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by the skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention will be described below with reference to flowchart illustrations and/or block diagrams of methods, apparatus (systems) and computer program products according to embodiments of the invention. It will be understood that each block of the flowchart and/or block diagrams, and combinations of blocks in the flowchart and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/operations specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce a manufacture including instructions means for implementing the functions/operations specified in block(s) of the flowcharts and/or block diagrams.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/operations specified in block(s) of the flowcharts and/or block diagrams.

Nowadays there have been provided memory copy functions that may be implemented on various operating systems. For example, there is shown below the function code that is implemented in "string.h" in C language.

```
void *memcpy(void *dest, const void *src, size_t count)
{
    char *tmp=dest;
    const char *s=src;
    while (count --)
    *tmp ++=*s++;
        return dest
}
```

Figure 2:
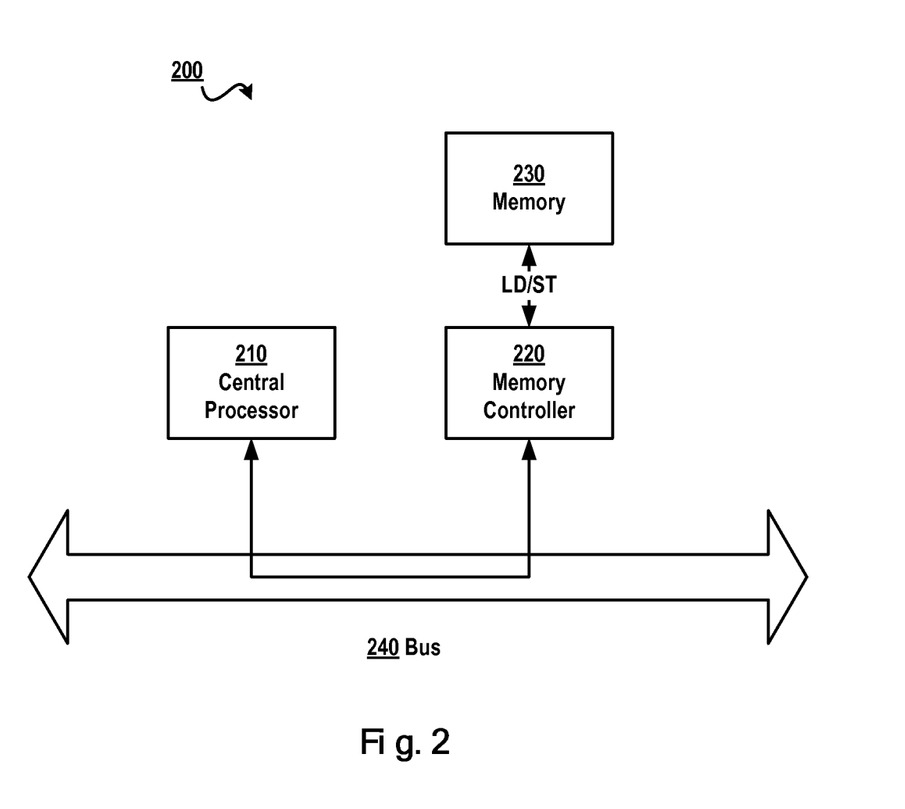
FIG. 2 schematically shows a block diagram of a method for performing memory copy according to one solution.

When executing the function actually, to-be-copied data in the memory needs to be copied byte by byte, which thus causes a low efficiency FIG. 2 schematically shows the concrete executing procedure of the memcpy function. When executing the memcpy function, for each byte in the to-be-copied data, a central processor 210 sends a data fetch instruction to a memory controller 220 via a bus 240, and then the memory controller 220 loads one byte from a source address in a memory 230 and returns this byte to the central processor 210. Afterwards, the central processor 210 notifies the memory controller 220 to store this byte to a destination address in the memory 230. Next, the memory controller 220 stores this byte to the destination address in the memory 230.

In the above manner, the central processor 120 needs to cyclically notify the memory controller 220 to perform the LOAD/STORE operations, and every byte in the to-be-copied data needs to be transmitted via the bus 240. Hence, it spends considerable time on the cyclic control and data transmission on the bus. Although the memcpy function via which 4 or more bytes may be copied at one time has been developed, its execution efficiency is far from satisfactory. The reason is as below: with reference to FIG. 2, the memcpy function merely involves copying data from the source address in the memory to the destination address; however, during execution, the to-be-copied data needs to be transmitted byte by byte (or multiple bytes at one time, e.g., 4 or more bytes at one time) to the central processor via the bus and then to be stored to the destination address in the memory. Hence, these memory copy approaches require occupying the central processor and the bus resources, which results in a low execution efficiency.

Figure 3:
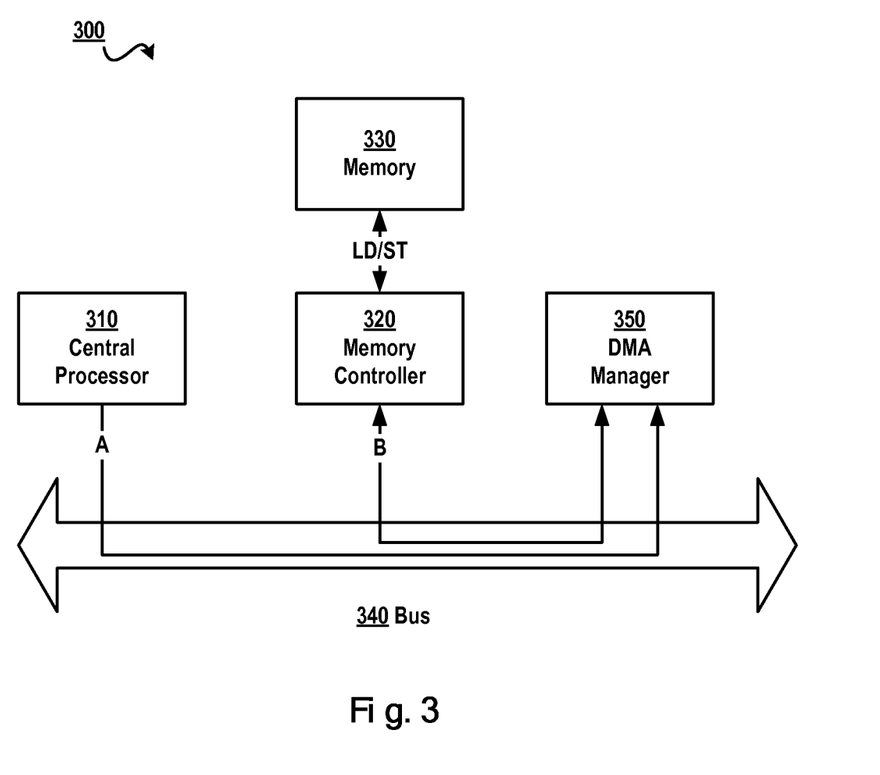
FIG. 3 schematically shows a block diagram of a method for performing memory copy according to another solution.

FIG. 3 schematically shows a block diagram 300 of a method for performing memory copy according to another solution. In this solution, by setting a DMA (Direct Memory Access) manager, a central processor may be freed from memory copy instructions, and the memory copy procedure is controlled by the DMA manager. As shown in FIG. 3, a central processor 310 notifies via a bus 340 a DMA manager 350 to perform memory copy (as shown by arrow A), and then the DMA manager 350 executes instructions for controlling memory copy, which are executed by the central processor 120 in the solution shown in FIG. 2. In this way, the reliance of memory copy on the central processor may be reduced greatly. At this point, however, the to-be-copied data still needs to be transmitted frequently between a memory controller 320 and the DMA manager 350 via the bus 340. The workload of the bus remains a bottleneck affecting the efficiency, so the execution efficiency is still unsatisfactory.

Confronted with these problems, embodiments of the present invention have provided a method and apparatus for high-efficiency memory copy, where the method may greatly reduce the reliance of memory copy on a central processor and bus resources, and memory copy may be fast and efficiently performed by a memory controller.

Figure 4:
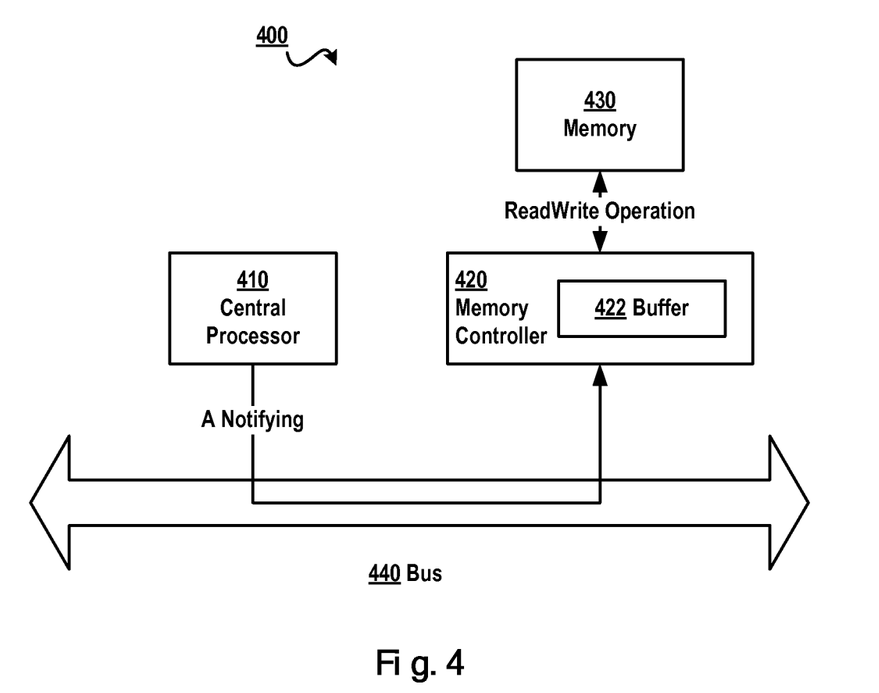
FIG. 4 schematically shows a block diagram of a method for performing memory copy according to one embodiment of the present invention.

FIG. 4 schematically shows a block diagram 400 of a method for performing memory copy according to one embodiment of the present invention. In this embodiment, a central processor 410 only needs to notify via a bus 440 a memory controller 420 to perform memory copy, and then the memory controller 420 itself can control how to perform memory copy. At this point, only the notification (as shown by arrow A) needs to be transmitted over the bus 440, while the to-be-copied data itself does not need to be transmitted over the bus 440.

In one embodiment of the present invention, there is provided a method for performing memory copy, including: decoding a memory copy instruction into at least one microcode in response to receipt of the memory copy instruction; transforming the at least one microcode into a ReadWrite Command for each of the at least one microcode; and notifying a memory controller to execute the ReadWrite Command; where the ReadWrite Command is executed by the memory controller and comprises at least a physical source address, a physical destination address and a ReadWrite length that are associated with the ReadWrite Command.

Figure 5:
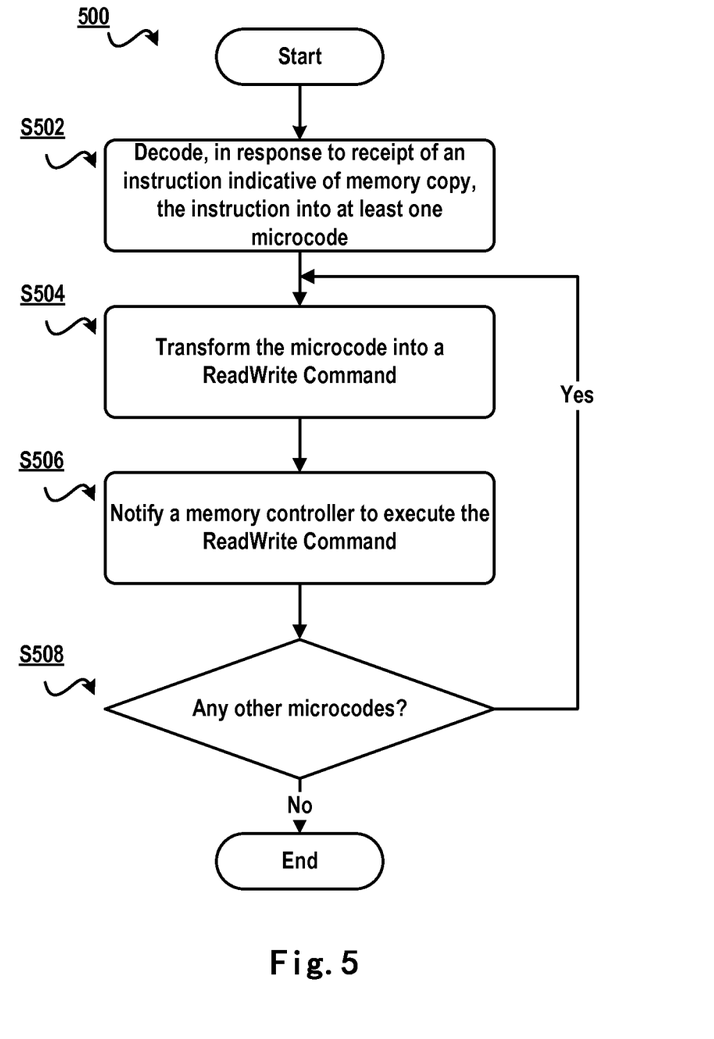
FIG. 5 schematically shows a flowchart of a method for performing memory copy according to one embodiment of the present invention.

Reference is made to FIG. 5, which schematically shows a block diagram 500 of a method for performing memory copy according to one embodiment of the present invention. In step S502, in response to receipt of an instruction indicative of memory copy, the instruction is decoded into the at least one microcode. Here, the memory copy instruction means an instruction that defines the copying of to-be-copied data in a memory from one location to another location. Since there are a plurality of pages in the memory, the to-be-copied data might be distributed among multiple pages. If a size of the to-be-copied data exceeds a size of one page, although the to-be-copied data is represented by continuous logical addresses, the to-be-copied data may be physically distributed in a plurality of continuous or discontinuous pages. Therefore, the memory copy instruction will be decoded into a plurality of microcodes, wherein each microcode corresponds to a copy operation on data in one page of the memory.

In steps S504-S508, processing is implemented for each of the at least one microcode. In step S504, the at least one microcode is transformed into a ReadWrite Command. In embodiments of the present invention, the ReadWrite Command refers in particular to an operation of copying the to-be-copied data from one location of the memory to another location thereof. The executing subject of the command is a memory manager, instead of the central processor or the DMA manager in the foregoing solutions. In addition, in the embodiment of the present invention, the ReadWrite Command is an atomic command executed by the memory manager, instead of a combination of the LOAD/STORE operations performed by the memory controller as described above.

In step S506, a memory controller is notified to execute the ReadWrite Command. It should be noted that the ReadWrite Command here includes at least a physical source address, a physical destination address and a ReadWrite length that are associated with the ReadWrite Command. Therefore, the memory controller may perform copy in the memory based on the physical source address, the physical destination address and the ReadWrite length. Next, in step S508 it is determined whether there is any other microcode or not. If there is any unprocessed microcode, then the flow returns to step S504; otherwise, the flow ends.

In one embodiment of the present invention, the memory copy instruction includes a source address, a destination address and a data length. It should be noted that here each of the source address and the destination address may be a virtual address, other than a physical address indicating a real storage address in the memory. The instruction may be of various forms, e.g., represented using ldst (desAdd, srcAdd, len), wherein desAdd denotes the destination address, srcAdd denotes the source address, and len denotes the data length. The one skilled in the art may use other instruction symbols to represent the instruction or use other variable names to represent the three parameters of the instruction. Or, locations of the parameters may differ.

In one embodiment of the present invention, decoding a memory copy instruction into the at least one microcode in response to receipt of the memory copy instruction may include: translating the source address, the destination address and the data length to a microcode source address, a microcode destination address and a microcode data length for each of the at least one microcode based on a page size of a memory.

According to the page size of the memory, it is possible to calculate which page in the memory the to-be-copied data is in, or which pages in the memory the to-be-copied data crosses. For example, the memory copy instruction may be: ldst (0xA . . . 00 . . . , 0xB . . . 00 . . . , 10 k)

The instruction represents that the destination address is 0xA . . . 00 . . . , the source address is 0xB . . . 00 . . . , and the data length is 10 k. Suppose a page size of the memory is 4 k, then the instruction may be decoded into 3 microcodes. Information associated with each of the 3 microcodes is as shown in Table 1.

TABLE 1

Microcode Information

| No. | Microcode Destination Address | Microcode Source Address | Microcode Data Length |
|---|---|---|---|
| 1 | 0xA . . . 00 . . . | 0xB . . . 00 . . . | 4k |
| 2 | 0xA . . . 10 . . . | 0xB . . . 10 . . . | 4k |
| 3 | 0xA . . . 20 . . . | 0xB . . . 20 . . . | 2k |

Here, the "microcode data length" of the 3 microcodes is 4 k, 4 k and 2 k, respectively. Thus, the to-be-copied data length in each of the microcodes is 4 k, 4 k and 2 k, respectively. It should be noted that at this point, the source address "0xB . . . 00 . . . " in the memory copy instruction is exactly the start location of one page, so the "microcode data length" in the first microcode is exactly the length of one page, i.e., 4 k.

In one embodiment of the present invention, transforming the microcode into the ReadWrite Command for each of the at least one microcode may include: interpreting the microcode source address and the microcode destination address of the microcode as a physical source address and a physical destination address of the ReadWrite Command, respectively, according to a lookup table. In the lookup table, there may be saved a mapping relationship between a virtual address and a physical address, by means of which, a virtual address associated with a microcode may hence be translated into a physical address associated with a ReadWrite Command. For example, the 3 microcodes in Table 1 may be transformed into 3 ReadWrite Commands as shown in Table 2. At this point, the ReadWrite Commands as shown in Table 2 are commands executable by the memory controller.

TABLE 2

ReadWrite Command Information

| No. | Physical Destination Address | Physical Source Address | ReadWrite Length |
|---|---|---|---|
| 1 | 0xC . . . 00 . . . | 0xD . . . 00 . . . | 4k |
| 2 | 0xC . . . 10 . . . | 0xD . . . 10 . . . | 4k |
| 3 | 0xC . . . 20 . . . | 0xD . . . 20 . . . | 2k |

Figure 6:
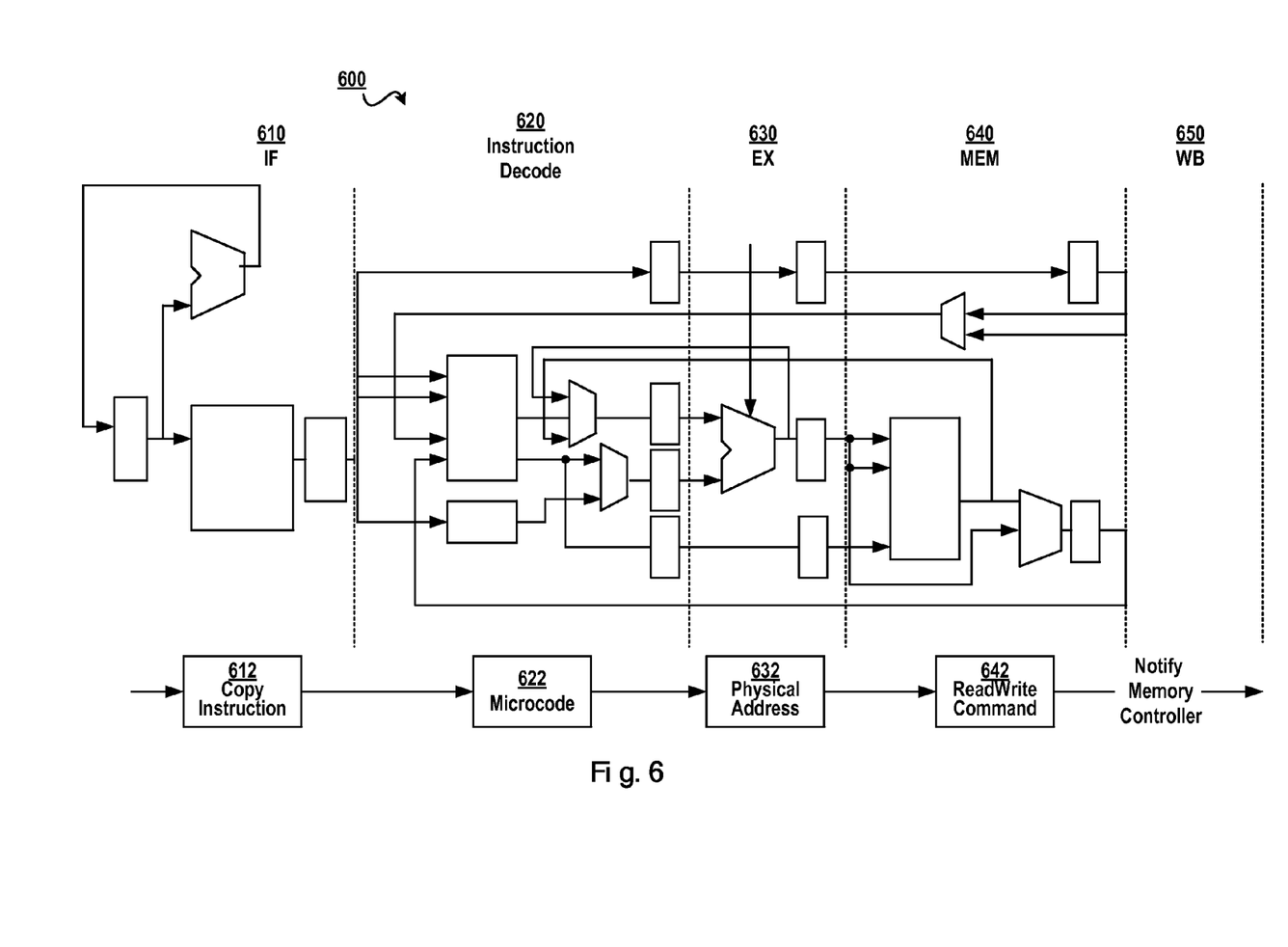
FIG. 6 schematically shows a block diagram of a method performed at a central processor side according to one embodiment of the present invention.

Hereinafter reference will be made to a pipeline of a central processor to illustrate how the central processor performs the method according to embodiments of the present invention. FIG. 6 schematically shows a block diagram 600 of a method performed at the central processor side according to one embodiment of the present invention. At the top of FIG. 6 there are shown respective stages of a standard pipeline of the central processor, namely IF (Instruction Fetch) 610, ID (Instruction Decode) 620, EX (Execute) 630, MEM (Memory Access) 640 and WB (Write Back) 650.

In the bottom blocks 612-642 of FIG. 6, there is shown processing of the memory copy instruction in the respective stages of the pipeline of the central processor. A copy instruction 612, e.g., the foregoing instruction ldst (0xA . . . 00 . . . , 0xB . . . 00 . . . , 10 k) is obtained in the IF stage 610. In the Decode stage 620, the copy instruction 612 is then decoded into the at least one microcode (e.g., the microcode as shown in Table 1), wherein the number of the microcode(s) depends on the length and the location of the to-be-copied data. In the EX stage 630, a microcode source address and a microcode destination address of the microcode are interpreted as a physical source address and a physical destination address of a ReadWrite Command according to the lookup table. Subsequently in the MEM stage 640, at least one ReadWrite Command 642 associated with the memory copy instruction may be obtained:

ReadWrite (0xC . . . 00 . . . , 0xD . . . 00 . . . , 4 k);
ReadWrite (0xC . . . 10 . . . , 0xD . . . 10 . . . , 4 k);
ReadWrite (0xC . . . 20 . . . , 0xD . . . 20 . . . , 2 k);

Finally, in the WB stage 650 the memory controller is notified to execute the foregoing ReadWrite Commands.

In one embodiment of the present invention, the steps of decoding, transforming and notifying are performed at the central processor. Since the method of embodiments of the present invention only requires the central processor to interpret the copy instruction as corresponding ReadWrite Commands and to notify the memory controller to execute the specific ReadWrite Commands, the burden on the central processor is lowered greatly, and the bottleneck in the prior art caused by the workload of the central processor is thus removed.

In one embodiment of the present invention, notifying a memory controller to execute the ReadWrite Command may include: copying data whose length is the ReadWrite length from the physical source address of a memory to the physical destination address via a buffer in the memory controller in response to receipt of the ReadWirte Command.

In the context of embodiments of the present invention, the specific operations of the data copy are performed by the memory controller. It should be noted that at this point, the memory controller copies the to-be-copied data from the physical source address to the physical destination address via a buffer, without transmitting the to-be-copied data over the bus. In this way, even when the bus is completely occupied by other operations, no impact will be exerted on the memory controller to perform the data copy, so the bottleneck in the prior art caused by the workload of the bus is removed. By means of embodiments of the present invention, it may greatly increase the execution efficiency of memory copy and make the execution of memory copy independent of the workloads of the central processor and the bus as much as possible.

In one embodiment of the present invention, copying data whose length is the ReadWrite length from the physical source address of the memory to the physical destination address via a buffer in the memory controller in response to receipt of the ReadWrite Command may include: according to a size of the buffer in the memory controller, dividing data in the memory which starts from the physical source address and whose length is the ReadWrite length into at least one data block; in at least one turn, writing, via the buffer, one of the at least one data block to an address in the memory corresponding to the physical destination address.

Because the size of the buffer in the memory controller is limited, usually it is impossible to store all of the to-be-copied data to the buffer once, and the to-be-copied data may be divided into blocks according to the size of the buffer. By dividing the to-be-copied data into at least one data block, all of the to-be-copied data may be copied from the physical source address to the physical destination address block by block in a plurality of turns.

Figure 7:
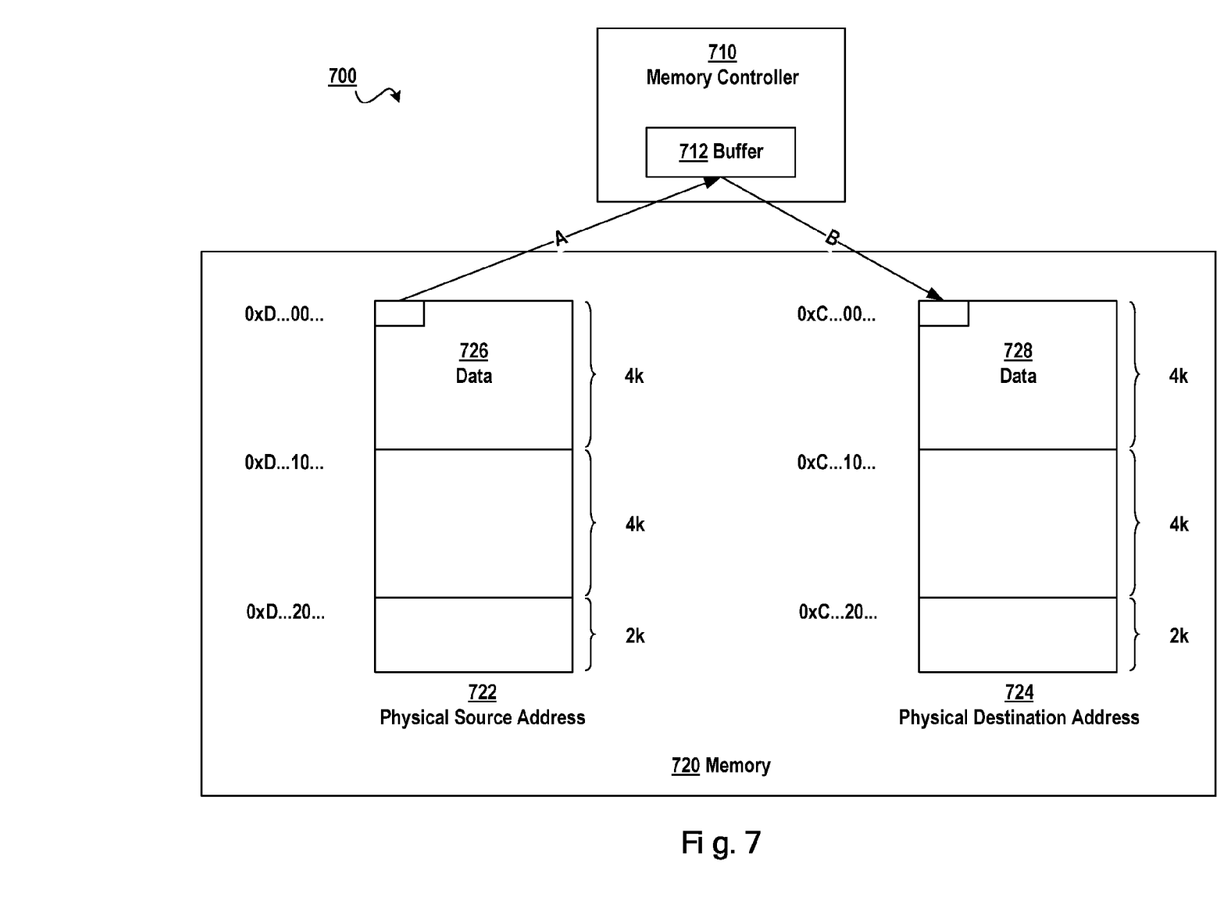
FIG. 7 schematically shows a block diagram of a method performed at a memory controller side according to one embodiment of the present invention.

FIG. 7 schematically shows a block diagram 700 of a method performed at the memory controller side according to one embodiment of the present invention. According to one embodiment of the present invention, it is necessary to occupy one buffer (e.g., buffer 712) in a memory controller 710. The one skilled in the art may define the size of the buffer as required. For example, the size of the buffer may be set as 4 bytes, 8 bytes, or 16 bytes, etc.

Hereinafter, detailed description will be presented regarding how a memory controller can realize memory copy. Still referring to the foregoing example, suppose that the memory controller 710 receives the above-described 3 ReadWrite Commands: 1) ReadWrite (0xC . . . 00 . . . , 0xD . . . 00 . . . , 4 k); 2) ReadWrite (0xC . . . 10 . . . , 0xD . . . 10 . . . , 4 k); and 3) ReadWrite (0xC . . . 20 . . . , 0xD . . . 20 . . . , 2 k). The block diagram 722 at the left side of FIG. 7 represents source addresses of the to-be-copied data, and a block diagram 724 at the right side of FIG. 7 represents destination addresses of the to-be-copied data. Here, both of these addresses are physical addresses.

Data 726 as shown at the left side of FIG. 7 represents 4 k to-be-copied data (one page) between physical addresses, 0xD . . . 00 . . . and 0xD . . . 10 . . . , while data 728 as shown at the right side of this figure represents a destination address of the data 726. Suppose that the size of the buffer 712 is 4 bytes, then the data 726 will be divided into 1 k data blocks. For example, regarding the first data block, this data block is read into the buffer 712 as shown by arrow A, and subsequently, data in the buffer 712 is written into the corresponding destination address as shown by arrow B. Similar operations are performed on each data block, whereby all content in the data 726 is copied to the location of the data 728.

Similarly, regarding data in other pages at the side of the physical source address 722, the one skilled in the art may perform corresponding processing based on the above-described dividing and copying principles. It should be noted that although the start location of the to-be-copied data shown in FIG. 7 is exactly the start of one memory page, in a case where the to-be-copied data is located in the middle of one memory page, the one skilled in the art may also perform corresponding processing based on the above-described principles.

It should be noted that in the context of embodiments of the present invention, a source region and a destination region of the to-be-copied data may overlap, at which point a special algorithm is required to ensure the accuracy of copy. For example, a back-to-front approach or a front-to-back approach may be used. In other words, when a source region and a destination region overlap and a physical source address is smaller than a physical destination address, a back-to-front approach may be used: starting from the end of the to-be-copied data, and copying data blocks from the source address to the destination address one by one via the buffer in the memory controller. When a source region and a destination region overlap and a physical source address is larger than a physical destination address, a front-to-back approach may be used. It should be noted that a size of a data block may be smaller than or equal to the smaller one of the size of the buffer and a difference between the physical source address and the physical destination address; otherwise, if a size of a data block is too large, such an error may be caused that copied data blocks cover the to-be-copied data which has not been copied.

Figure 8:
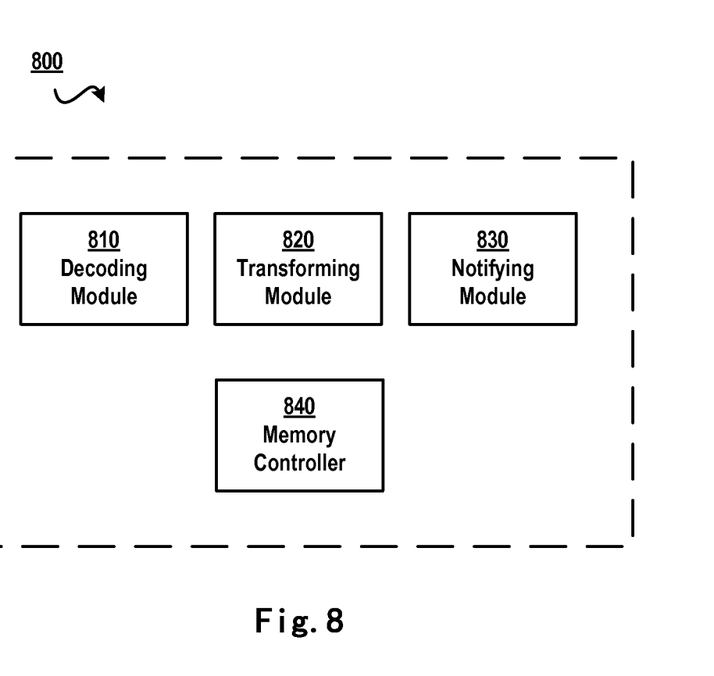
FIG. 8 schematically shows a logical block diagram of a system for performing memory copy according to one embodiment of the present invention.

FIG. 8 schematically shows a logical block diagram 800 of a system for performing memory copy according to one embodiment of the present invention. FIG. 8 shows a system for performing memory copy, the system may include: a decoding module configured to decode a memory copy instruction into at least one microcode in response to receipt of the memory copy instruction; a transforming module configured to transform the at least one microcode into a Read-Write Command for each of the at least one microcode; and a notifying module configured to notify a memory controller to execute the ReadWrite Command; where the memory controller is configured to execute the ReadWrite Command; were the ReadWrite Command comprises at least a physical source address, a physical destination address and a Read-Write length that are associated with the ReadWrite Command.

In one embodiment of the present invention, the memory copy instruction may include a source address, a destination address and a data length.

In one embodiment of the present invention, the decoding module may include: a translating module configured to translate the source address, the destination address and the data length to a microcode source address, a microcode destination address and a microcode data length for each of the at least one microcode based on a page size of a memory.

In one embodiment of the present invention, the transforming module may include: an interpreting module configured to interpret the microcode source address and the microcode destination address of the microcode as a physical source address and a physical destination address of the ReadWrite Command according to a lookup table.

In one embodiment of the present invention, the memory controller is configured to copy data whose length is the ReadWrite length from the physical source address of the memory to the physical destination address in response to receipt of the ReadWrite Command.

In one embodiment of the present invention, the memory controller may include: a dividing module configured to divide data in the memory, which starts from the physical source address and whose length is the ReadWrite length, into at least one data block according to a size of a buffer in the memory controller; and a copy module configured to write one of the at least one data block into an address in the memory which corresponds to the physical destination address, via the buffer in at least one turn.

In one embodiment of the present invention, the decoding module, the transforming module and the notifying module are all included in a central processor.

The flowchart and block diagrams in the Figures illustrate the architecture, functionality, and operation of possible implementations of systems, methods and computer program products according to various embodiments of the present invention. In this regard, each block in the flowchart or block diagrams may represent a module, a program segment, or a portion of codes, including one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing a memory copy, the method comprising:
    decoding a memory copy instruction into at least one microcode in response to receipt of the memory copy instruction;
    transforming the at least one microcode into a ReadWrite Command for each of the at least one microcode; and
    notifying a memory controller to execute the ReadWrite Command;
    wherein the ReadWrite Command is executed by the memory controller and comprises at least a physical source address, a physical destination address and a ReadWrite data length that are associated with the ReadWrite Command.

2. The method according to claim 1, wherein the memory copy instruction comprises a source address, a destination address and a data length.

3. The method according to claim 2, wherein decoding the memory copy instruction into the at least one microcode in response to receipt of the memory copy instruction comprises:
    translating the source address, the destination address and the data length to a microcode source address, a microcode destination address and a microcode data length for each of the at least one microcode based on a page size of a memory.

4. The method according to claim 3, wherein transforming the microcode into the ReadWrite Command for each of the at least one microcode comprises:
    interpreting the microcode source address and the microcode destination address of the at least one microcode as a physical source address and a physical destination address of the ReadWrite Command, respectively, according to a lookup table.

5. The method according to claim 1, wherein notifying a memory controller to execute the ReadWrite Command comprises:
    copying data whose length is the ReadWrite data length from the physical source address of a memory to the physical destination address via a buffer in the memory controller in response to receipt of the ReadWrite Command.

6. The method according to claim 5, wherein copying data whose length is the ReadWrite data length from the physical source address of the memory to the physical destination address via a buffer in the memory controller in response to receipt of the ReadWirte Command comprises:

dividing data in the memory, which starts from the physical source address and whose length is the ReadWrite data length, into at least one data block according to a size of the buffer in the memory controller; and
    writing one of the at least one data block to an address in the memory which corresponds to the physical destination address, via the buffer in at least one turn.

7. The method according to claim 1, wherein decoding, transforming and notifying are implemented on a central processor.

8. A system for performing a memory copy, the system comprising:
    a decoding module configured to decode a memory copy instruction into at least one microcode in response to receipt of the memory copy instruction;
    a transforming module configured to transform the at least one microcode into a ReadWrite Command for each of the at least one microcode; and
    a notifying module configured to notify a memory controller to execute the ReadWrite Command;
    wherein the memory controller is configured to execute the ReadWrite Command;
    wherein the ReadWrite Command comprises at least a physical source address, a physical destination address and a ReadWrite data length that are associated with the ReadWrite Command.

9. The system according to claim 8, wherein the memory copy instruction comprises a source address, a destination address and a data length.

10. The system according to claim 9, wherein the decoding module comprises:
    a translating module configured to translate the source address, the destination address and the data length to a microcode source address, a microcode destination address and a microcode data length for each of the at least one microcode based on a page size of a memory.

11. The system according to claim 10, wherein the transforming module comprises:
    an interpreting module configured to interpret the microcode source address and the microcode destination address of the microcode as a physical source address and a physical destination address of the ReadWrite Command according to a lookup table.

12. The system according to claim 8, wherein the memory controller is configured to copy data whose length is the ReadWrite data length from the physical source address of the memory to the physical destination address in response to receipt of the ReadWrite Command.

13. The system according to claim 12, wherein the memory controller comprises:
    a dividing module configured to divide data in the memory, which starts from the physical source address and whose length is the ReadWrite data length, into at least one data block according to a size of a buffer in the memory controller; and
    a copy module configured to write one of the at least one data block to an address in the memory which corresponds to the physical destination address, via the buffer in at least one turn.

14. The system according to claim 8, further comprising:
    a central processor for performing the memory copy comprising the decoding module, the transforming module and the notifying module.

* * * * *